United States Patent [19]

Last

[11] 4,401,195
[45] Aug. 30, 1983

[54] AUTOMATIC BRAKE ADJUSTER

[75] Inventor: Larry L. Last, Ypsilanti, Mich.

[73] Assignee: Kelsey-Hayes Company, Romulus, Mich.

[21] Appl. No.: 264,262

[22] Filed: May 18, 1981

[51] Int. Cl.³ .............................................. F16D 65/56
[52] U.S. Cl. .......................... 188/79.5 P; 188/196 BA
[58] Field of Search .................. 188/79.5 P, 79.5 GC, 188/79.5 GR, 196 F, 196 BA

[56] References Cited

U.S. PATENT DOCUMENTS

| | | | |
|---|---|---|---|
| 3,189,132 | 6/1965 | Mossey | 188/79.5 GC |
| 3,221,842 | 12/1965 | Shampton | 188/79.5 GC |
| 3,963,100 | 6/1976 | Kaub | 188/79.5 P |
| 4,223,765 | 9/1980 | Turak | 188/79.5 GT X |
| 4,243,125 | 1/1981 | Spaargaren et al. | 188/79.5 P |
| 4,276,966 | 7/1981 | Ayers | 188/79.5 P |

FOREIGN PATENT DOCUMENTS 2903686  8/1979  Fed. Rep. of Germany ... 188/79.5 P

Primary Examiner—Duane A. Reger
Attorney, Agent, or Firm—Ralph J. Skinkiss

[57] ABSTRACT

An automatic adjusting mechanism for a drum brake is disclosed. A spring-loaded adjusting lever is pivotally mounted on the web of one of the brake shoes such that the pivotal movement of the adjusting lever is limited to a predetermined amount of rotation. The adjusting lever is preferably of a stamped construction and includes discreet axially-protruding pads for low-friction engagement with the web of the brake shoe upon which it is mounted.

11 Claims, 12 Drawing Figures

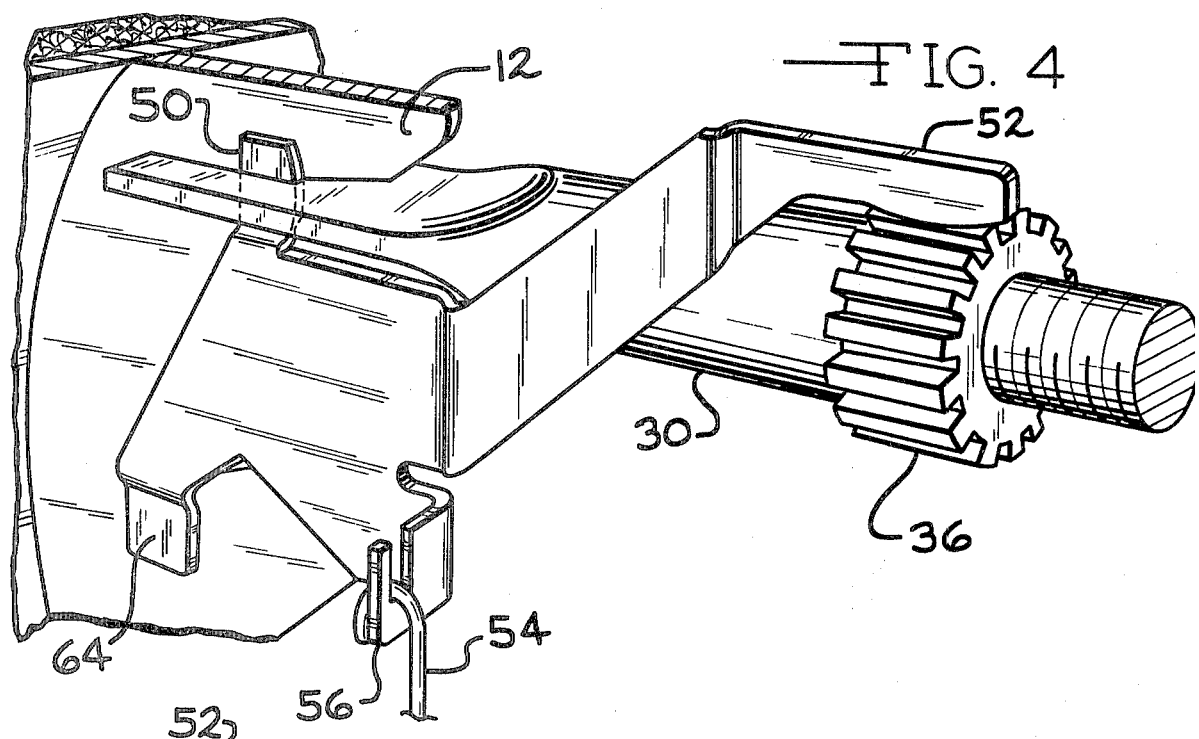
FIG. 4
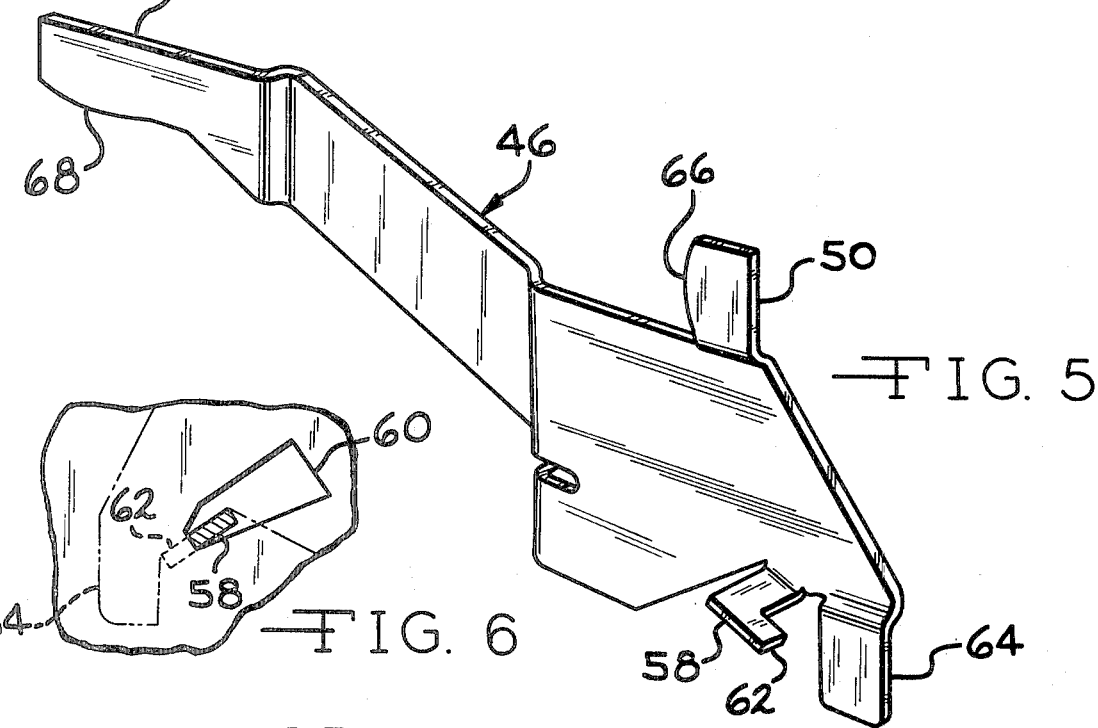
FIG. 5
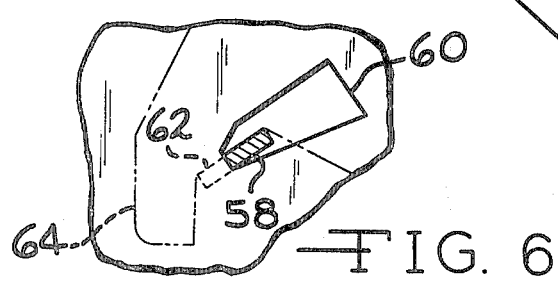
FIG. 6
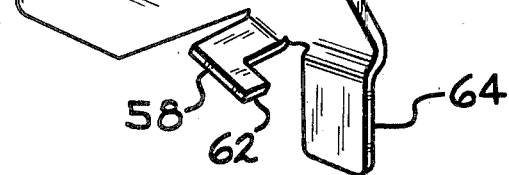
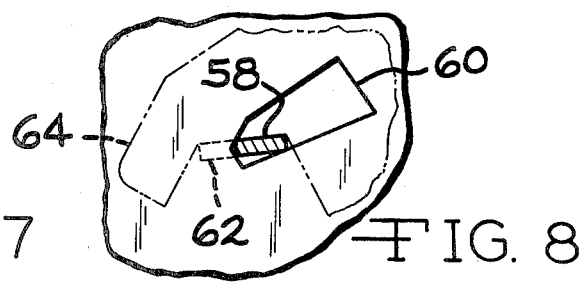
FIG. 7
FIG. 8

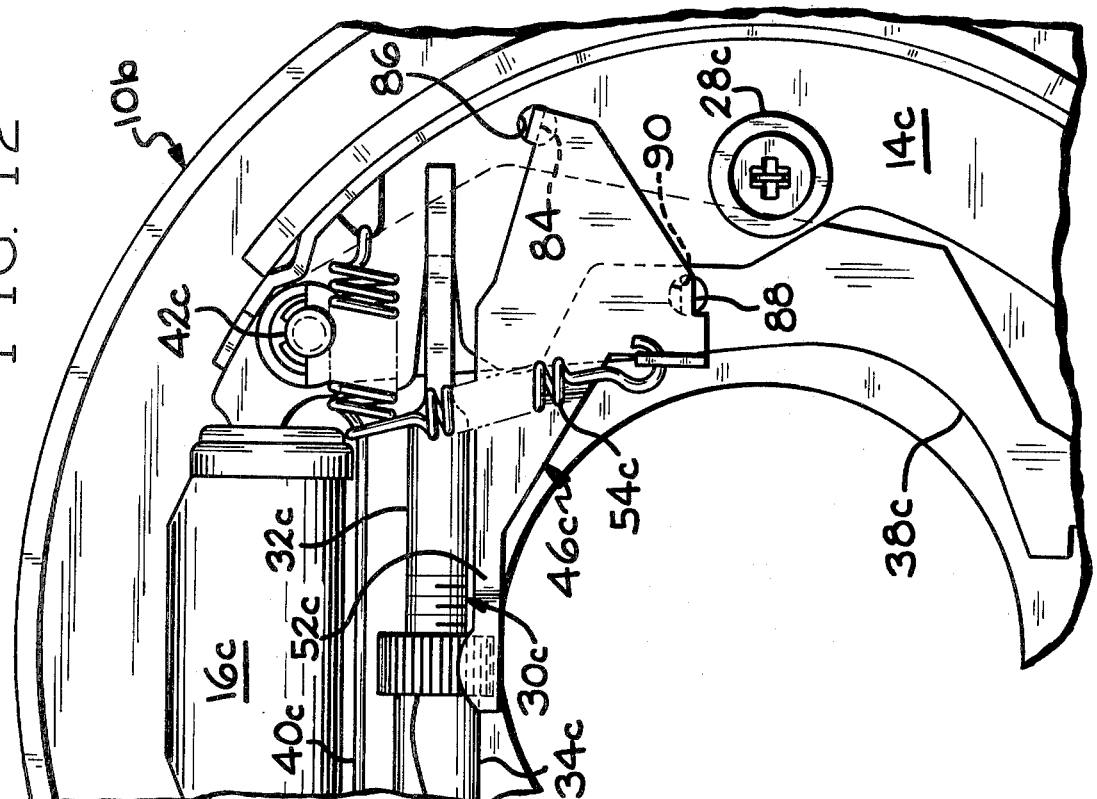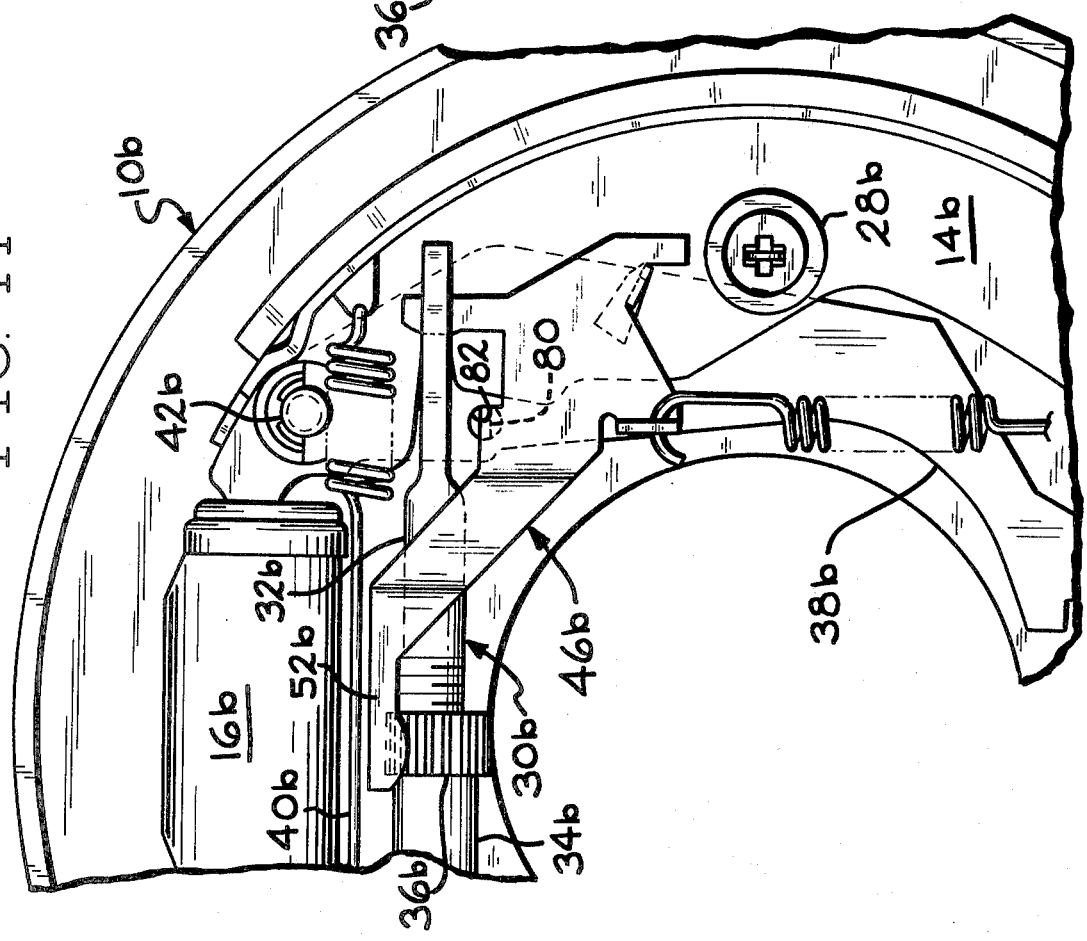

AUTOMATIC BRAKE ADJUSTER

TECHNICAL FIELD

The present invention relates to a new and improved automatic adjuster for internal shoe drum brakes; and more particularly to an automatic adjuster for leading and trailing shoe drum brakes.

BACKGROUND OF THE INVENTION

Internal shoe drum brakes generally comprise a pair of outwardly facing arcuate, brake shoes arranged back to back and which brakes are actuated by pushing the adjacent head ends of the shoes outwardly into engagement with the drum. An anchor is positioned between the heels of the shoes in the leading and trailing shoe type brakes, while the heels of the two shoes are connected together in a duo-servo type brake. In order that a predetermined brake actuating movement will be necessary regardless of the amount of brake shoe lining wear, an expansible star wheel actuated strut is positioned between the head end of the shoes to limit their retractile movement. As shoe lining wear occurs, it is necessary to rotate the star wheel and expand the shoes outwardly by an appropriate amount to maintain the desired shoe to drum clearance. Brakes as above described have been made for many, many years, and there has been a continuing effort to reduce both the number of parts in the brake, and the cost of their manufacture. The cost of manufacture is controlled in part by the type of manufacturing process involved in making the part, and also in part by the cost of assembly, particularly where hand operations are involved.

The principal object of the present invention is the provision of a new and improved automatic adjuster having a minimum of parts, and the principal part of which is a single, stamped, adjuster lever.

Another object of the present invention is the provision of an adjuster of the above described type in which the intallation of the adjuster involves a minimum of hand labor, that is essentially limited to: picking up the adjuster lever; placing it in a forwardly inclined position against the part of the brake on which it is to be installed and with its pivot tang in the hole in which it is to be installed, and with the actuating spring loosely installed; followed by rotating the adjuster lever about its pivot to both bring its actuating abutment behind its receiving abutment and tension the actuating spring. Thereafter the adjuster lever is released to allow the actuating spring to snap the adjuster lever to its final actuating position. To applicant's knowledge, such simplicity of assembly has never been achieved heretofore.

A further object of the invention is the provision of a new and improved automatic adjuster of the above described type in which the arcuate movement of the adjuster lever is limited by the shape of the pivot tang and the shape of the hole into which it is received.

A further object of the invention is the provision of pads on the adjuster lever which limits sliding friction to appropriate portions of the brake structure.

A still further object of the invention is the provision of stamped abutment surfaces on the adjuster lever which improve the consistency of operation, and reduce sliding friction so that a minimum of spring actuating force is required for its actuation.

Further objects and advantages of the invention will become apparent to those skilled in the art to which the invention relates from the following description of several embodiments described with reference to the accompanying drawings.

BRIEF DESCRIPTION OF THE DRAWINGS

FIG. 4 is a fragmentary oblique view of the adjuster and cooperating portion of the strut seen in FIGS. 2 through 3.

FIG. 5 is an oblique view of the adjuster lever shown in FIGS. 1 through 4.

FIG. 6 is a fragmentary view of the pivot of the adjuster lever, and the hole in which it is received.

FIG. 7 is similar to FIG. 6 but shows the pivotal tang rotated to one extreme position as limited by the shape of the hole in which it is received.

FIG. 8 is similar to FIGS. 6 and 7 but shows the rotational movement of the tang being stopped in the opposite direction by the hole in which it is received.

FIG. 11 is a fragmentary somewhat schematic view of a third embodiment of the invention in which a mechanical brake actuating lever operates the adjuster.

FIG. 12 is a fragmentary somewhat schematic view of a fourth embodiment of the invention wherein the adjuster is carried by the mechanical brake actuating lever.

DESCRIPTION OF THE PREFERRED EMBODIMENTS

Figure 1:
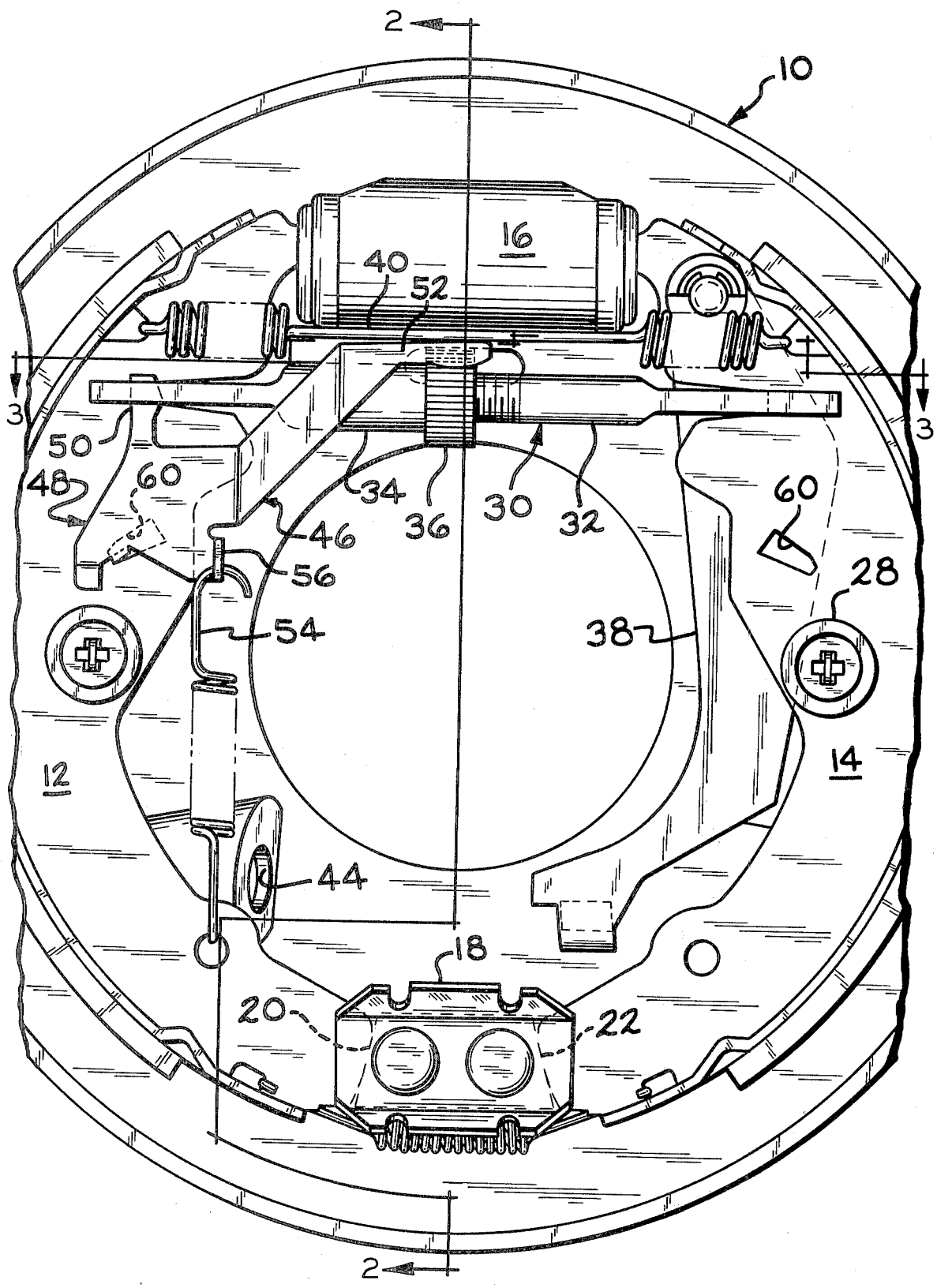
FIG. 1 is a side elevational view of an internal drum brake which embodies the adjuster of the present invention.
Figure 2:
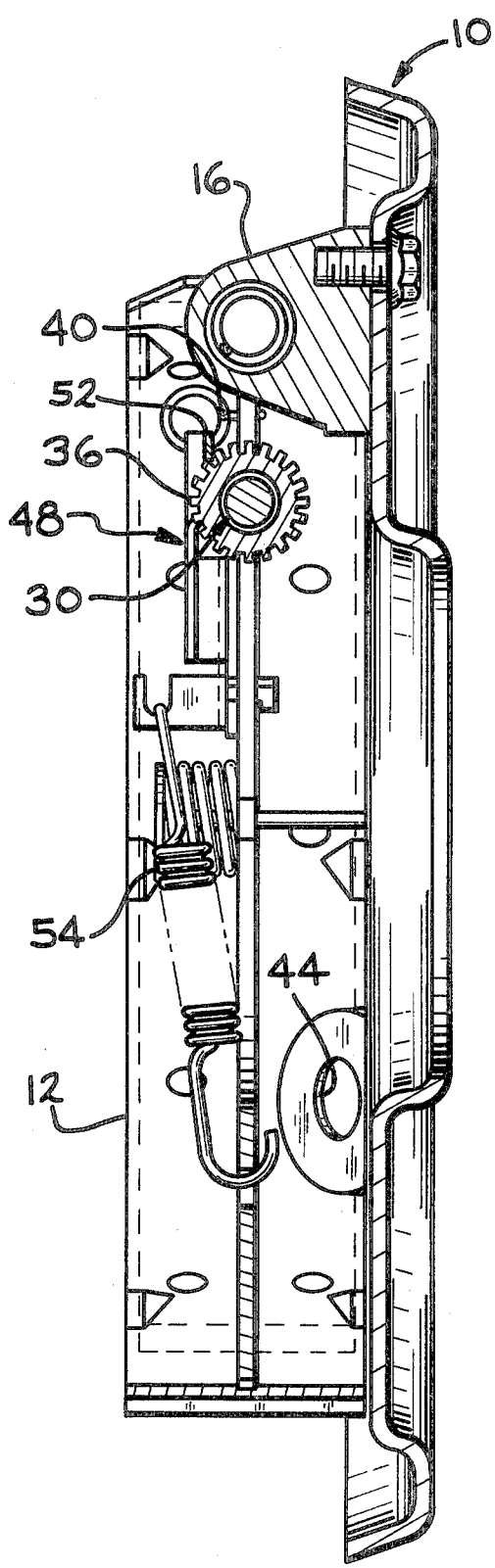
FIG. 2 is a sectional view taken approximately on the line 2—2 of FIG. 1.
Figure 3:
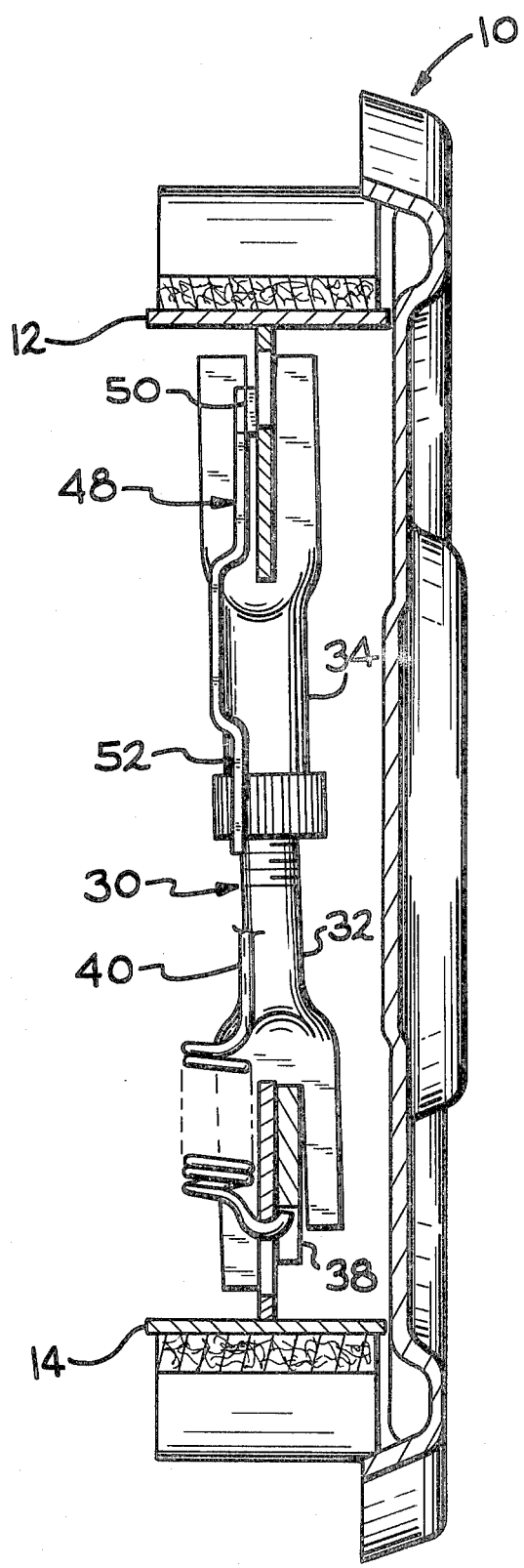
FIG. 3 is a sectional view taken approximately on the line 3—3 of FIG. 1.

The brake structure shown in FIGS. 1 through 8 generally comprises a circular back up plate 10 onto which the remaining structure of the brake is hung. Arcuate brake shoes 12 and 14 are arranged back to back with a double piston hydraulic actuator 16 positioned between the head end of the shoes. The opposite heel ends of the brake shoes are positioned adjacent an anchor 18 having radially oriented abutment surfaces 20 and 22 against which the heel ends of the shoes 12 and 14 abut, respectively. The brake shoes 12 and 14 are biased against their abutments by a coil spring 24 that is positioned against the bottom of the abutment with its opposite ends being bent up slightly and hooked into suitable holes in the adjacent heel portion of the respective shoe. The construction of spring 24 and surfaces 20 and 22 is such that the heels of the brake shoes will be moved radially outwardly when rotational engagement with the drum moves the shoes away from the abutment surfaces. Shoes 12 and 14 are held down upon the back up plate 10 by pivot pin and spring assemblies 26 and 28, respectively, as is well known in the art. The retracted position of the shoes is established by a start wheel actuated expansible strut 30, as best seen in FIGS. 1 and 3.

The strut 30 comprises a main body portion 32 having a shank with a threaded end that is received in a socket portion 34. A star wheel 36 having an appropriate number of teeth is threaded onto the shank for engagement with the end of the socket 34 to hold the strut in an expanded condition. The end of the socket portion is suitably notched to receive a cooperating notch in the shoe 12, and the main body portion 32 is suitably notched to receive a cooperating notch in the shoe 14 along with a mechanical actuating lever 38, later to be described. The shoes 12 and 14 are biased against their respective ends of the strut by a shoe retraction spring 40, the ends of which are hooked into openings in the head ends of the respective shoes. The upper end of mechanical actuating lever 38 is suitably pivoted by a pin 42 to the head end of the trailing shoe brake 14. The main body of the lever 38 extends downwardly behind the shoe 14 to a position just above the anchor where it receives a pull cable (not shown) that runs forwardly through a suitable opening 44 in the back up plate 10. An intermediate portion of the mechanical actuating lever 38 is adapted to bear against the end of the recess in the main body portion 32 of the strut to provide a brake actuating force against the end of the strut.

It is desired in the art to maintain a running clearance between the brake lining of the shoes and the drum of from about 10 to 20 thousands of an inch. It is also desired to maintain the amount of actuating movement that is required of the operator, generally constant regardless of wear. This is accomplished by expanding the strut at an appropriate time when the shoes and mechanical actuating lever are out of engagement with the strut, so that the frictional forces are at a minimum. This can be accomplished by rotating the star wheel 36, either at the time the shoes are moving toward the drum, or by rotating the star wheel at the time the shoes are returning from the drum to the strut.

In the embodiment shown in FIGS. 1 through 8, motion of the star wheel is produced by an actuating lever 46 that is loosely pivoted as at 48 to the leading shoe 12. The actuating lever 46 has an actuating finger 50 that is received in the same notched portion of the strut 30 that receives the shoe 12. The actuating lever 46 further includes a star wheel actuating finger 52 adapted to engage the outer top quarter of the star wheel 36. The geometry of the adjuster lever 46 is such that the distance from the pivot 48 to the portion of the finger 50 which abuts the star wheel is twice that between the pivot 48 and the portion of the actuating finger 50 which abuts the strut 30.

Rotation of the actuating finger 52 against the star wheel 36 is produced by a coil spring 54 one end of which is hooked onto a laterally outwardly bent spring retaining tang or abutment 56, the other end of which is hooked into an opening in the heel end of shoe 12. The pivot 48 for the adjuster lever 46 is provided by a laterally inwardly bent tang or pivot finger 58 that extends through a suitable opening 60 in the web of the shoe 12 beneath the strut 30. The end of pivot finger or tang 58 is provided with a hooked portion which extends away from the star wheel engaging finger 52 to prevent straight endwise removal from the opening 60. A laterally bent pad 64 is provided adjacent the pivot tang 58 for abutting the shoe to keep rotational friction therewith to a minimum. The actuating finger 50 is similarly laterally bent inwardly to provide a second pad for engaging the shoe adjacent the strut. The pads 64 and 50 provide a bearing axis about which the actuating lever can be efficiently biased laterally against the star wheel. The pads help make it possible for the rearward component of the spring 54 to effectively hold the star wheel engaging finger 52 in contact with the star wheel 36.

It is a further feature of the adjuster lever, that the abutment surface 66 on the actuating finger 50 is arcuately shaped in such manner that its contact with the strut 30 remains along the center line of the strut as it pushes the strut towards the opposite brake shoe during actuation of the brake. The abutment surface 68 on the star wheel engaging finger 52 is arcuately shaped in a similar manner to cause it to abut the center portion of the star wheel 36 during the actuating movement of the adjuster lever 46. Arcuate abutment surfaces 66 and 68 help to maintain the geometery previously described generally constant, to provide uniformity of operation, as well as to limit the surface that is subject to sliding friction during actuation of the lever. The center portion of the lever 46 is suitably bent outwardly to provide clearance with the adjacent portions of the strut.

Normal operation of the brake is provided by supplying pressure to the hydraulic brake actuator 16 causing the head ends of both shoes to move outwardly against the action of the shoe return spring 40 until the shoes engage the drum. During this shoe movement, the strut 30 is pushed toward the trailing shoe 14 by the actuating finger 50 under the action of the adjuster spring 54. During this action, the leading shoe 12 moves away from the end of the strut 30 by an amount equal to the combined clearance of both shoes with the brake drum. Also during this action, the star wheel engaging finger 52 of the adjuster lever moves downwardly towards the centerline of the strut. If the abutment surface 68 of the finger is on top of a tooth of the star wheel, the star wheel will be advanced for a distance which corresponds to approximately twice the distance of the movement of the abutment surface 66. The number of teeth on the star wheel is selected so that the finger abutment surface 68 will move one tooth spacing when the combined actuating movement of the shoe equals the desired running clearance of both shoes.

At the time that the shoes have been moved a distance corresponding to the desired running clearance, the abutment surface 68 will be at its normal lower limit of travel. If wear has occurred and the shoes move a slight distance further outwardly, the abutment surface 68 will move below its normal lower limit of travel line. Thereafter, when the shoes are allowed to retract, the shoes move away from the drum and the returning movement of the shoe 14 under the action of the spring 40 pushes the strut 30 up against the leading shoe 12 to establish the normal upper limit of travel of the abutment surface 68. At this time the abutment surface 68 will have moved just slightly above a new tooth on the star wheel 36, so that it will be moved by the finger 52 during the next outward movement of the shoes. If the strut 30 has been expanded more than the wear of the shoe lining, the new tooth will not be moved all of the way to the normal lower limit line. Upon the next retraction of the shoes, the abutment surface 68 will move off of the new tooth and will slide upwardly against the side of the next succeeding tooth, but without passing over the top thereof. During each actuation of the brake thereafter, the side of finger 52 will slide against the side of the succeeding tooth until sufficient brake lining wear occurs and the succeeding tooth is pushed below the normal lower limit line.

When it is desired to actuate the brake mechanically, the lower end of the mechanical actuating lever 38 is pulled forwardly until the lever 38 engages the right hand end of the strut 32. Thereafter continued movement causes the lever 38 to pivot about the right hand end of the strut and move the pivot pin 42 with the top of the trailing shoe 14, rearwardly. This in effect spreads the shoes apart to apply the brake.

In the embodiment of brake shown in FIG. 1, no brake adjustment occurs during actuation of the lever 38 because it creates a sufficient bind between the star wheel 36, socket 34, and the threads of the strut to prevent the spring 54 from rotating the star wheel. The brake shown in FIG. 1 is the left rear brake of a vehicle, and the left front brake of the vehicle will be similarly constructed excepting that the mechanical brake lever will usually be omitted. The brake structure for the right rear wheel of the vehicle will be identical to that of FIG. 1, but opposite hand thereto. The threads of the star wheel 36 and strut 30 shown in FIG. 1 are left hand threads, and in the opposite hand version, they will be right hand threads. The brake structure for the right front of the vehicle will be opposite hand to that shown in FIG. 1 and the mechanical brake lever 38 will usually be omitted.

The adjuster lever 46 is installed by hooking one end of the spring 54 to the brake shoe 12 and the other end over the top of the finger 56. The pivot finger 58 is laid on the bottom edge of the opening 60 with the top of the lever 46 inclined laterally outwardly from the shoe 12. Thereafter, the finger 52 is rotated counterclockwise until the actuating finger 50 is past the left end of the strut 30, and thereafter the adjuster lever 46 is moved laterally rearwardly up against the shoe 12 and released. Under the action of the spring 54, the actuating finger 50 moves along the edge of the groove in the end of the strut until it bottoms in the groove. Thereafter the pivot tang 58 will move to the left to lock onto the left edge of the opening 60. Following this, the adjuster lever 46 swings laterally about a line connecting the pad 64 and actuating finger 50 to move the abutment surface 68 of the finger 52 against the star wheel 36.

Because the star wheel 36 is only rotated during normal operation at a time when the compressive force on the strut is only that produced by the spring 54, the force required to rotate the star wheel 36 is only that required to overcome the friction between the star wheel's threads. This allows the force required of spring 54 to be quite small, and this inturn allows the adjuster lever 46 to be installed with a minimum of manual effort.

Because the abutment surfaces 20 and 22 on the anchor 18 extend radially, the shoes are maintained generally parallel with respect to each other during normal wear and adjustment of the brake lining. This helps to maintain the upper and lower normal limit of travel lines of the abutment surface 68 to take a generally fixed position relative to the centerline of the strut 30.

FIG. 6 of the drawings shows the position of the tang 58 in the hole 60 at the normal upper limit of travel of the finger 52. FIG. 7 shows an upper stopped position of rotation for the adjuster lever 46 with respect to the brake shoe, at which time a bind is produced between tang 58 and the top and bottom sides of the hole 60. It is desired, for a number of reasons to stop downward rotation of the adjuster lever 46 to a point slightly below the normal lower limit of travel of the finger 52. This lower stopped position is established by a bind of the tang 58 between the bottom and top sides of the hole 60 as shown in FIG. 8. It will now be seen that the entire automatic adjuster including the stops for its rotation is provided by a single lever, a spring, and the shape of the hole in which the pivot of the lever is positioned.

Figure 9:
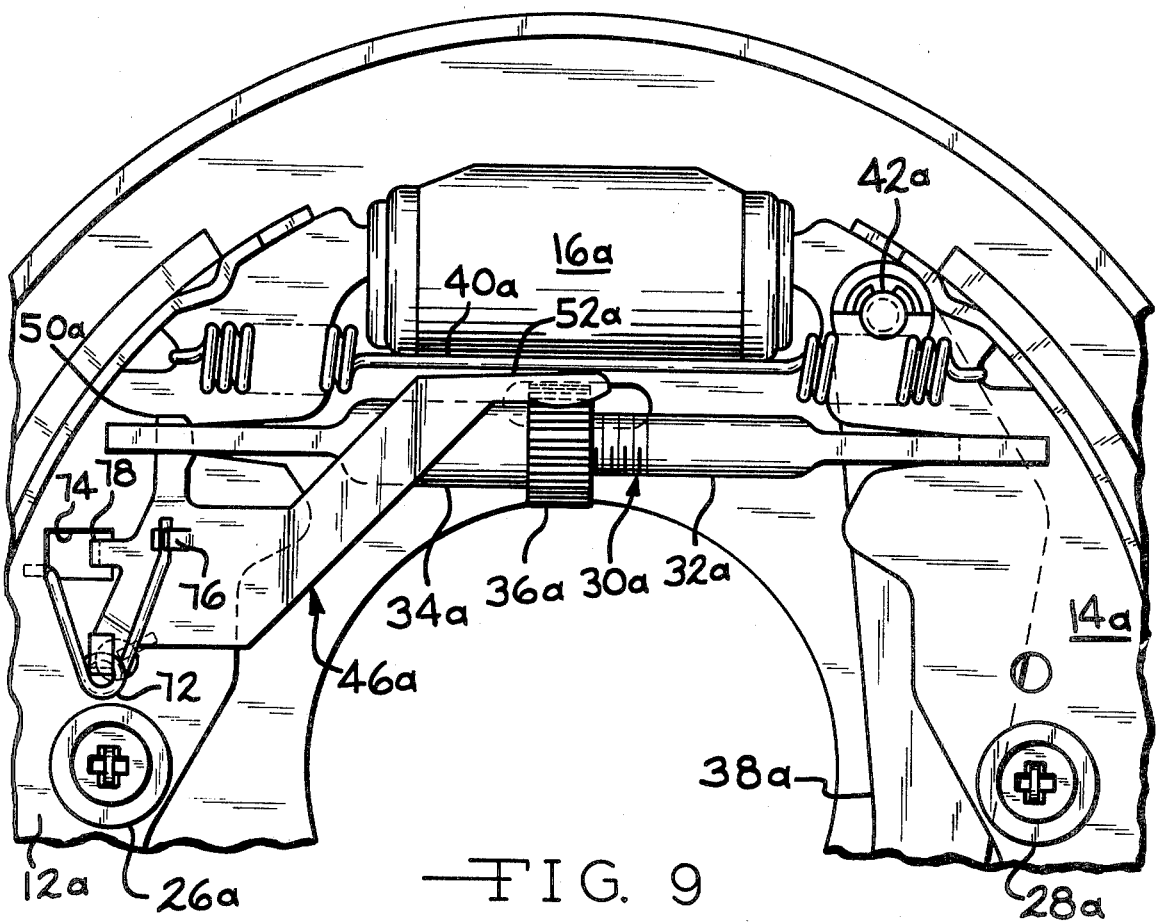
FIG. 9 is a partial elevational view of a brake having another embodiment of automatic adjuster of the present invention.
Figure 10:
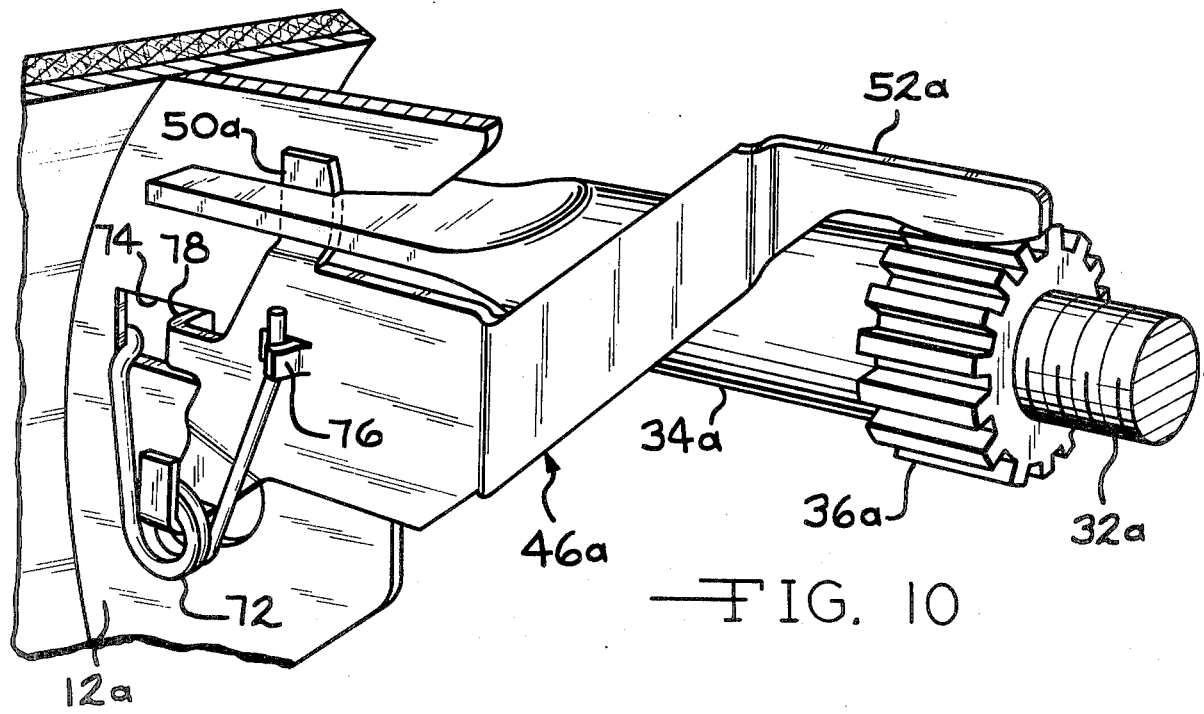
FIG. 10 is an oblique view similar to FIG. 4 but showing the second embodiment of adjuster.

The embodiment of the brake structure shown in FIGS. 9 and 10 is generally similar to that previously described, but differs principally therefrom in the type of spring which is utilized to actuate the adjuster lever. Those portions of the brake structure shown in FIGS. 9 and 10 which correspond to similar portions of the embodiment shown in FIGS. 1 through 8 are designated by a like reference numeral characterized further in that a suffix "a" is affixed thereto. In the embodiment shown in FIGS. 9 and 10, an outwardly bent U-shaped tang 70 is provided on the adjuster lever 46a adjacent the pivot tang 58a. The center coil of a combined compression and torsion spring 72 is slipped over the U-shaped tang 70 and one leg of the spring 72 is hooked against the rear of a suitable opening 74 in the web of the shoe 12a. The opposite leg of the combined compression and torsion spring 72 is caught behind an outwardly bent ear or abutment 76 that is stamped out of the body of the adjuster lever 46a. A stop for downward rotation of the adjuster lever is provided by a laterally rearwardly bent tang 70 that is adapted to engage the right surface of the hole 74. Operation and installation of the embodiment shown in FIGS. 9 and 10 is sufficiently similar to that previously described that it need not be further described.

The embodiment shown in FIG. 11 is similar to the embodiment shown in FIGS. 1 through 8 but differs principally therefrom in that its adjuster lever is mounted on the trailing shoe of the brake. Those portions of the embodiment shown in FIG. 11 which correspond to similar portions of the embodiment shown in FIGS. 1 through 8 are designated by a like reference numeral characterized further in that a suffix "b" is affixed thereto. The other principal difference is that the actuating finger for the adjuster lever 46b is a laterally rearwardly bent tang that is received in a suitable opening 82 in the mechanical actuating lever 38b. In this embodiment the strut 30b is not adjusted when the brakes are actuated hydraulically. This arrangement has the advantage that the strut is not expanded to the standard running clearance with an oversized drum created by thermal expansion and following which less than the desired running clearance results when the drum has cooled down and contracted to its normal size.

The embodiment shown in FIG. 12 is generally similar to that shown in FIGS. 1 through 8 but differs principally in that the adjuster lever is pivoted on the mechanical actuating lever. Those portions of the embodiment shown in FIG. 12 which corresponds to similar portions of the embodiment shown in FIGS. 1 through 8 are designated by a like reference numeral characterized further in that a suffix "c" is affixed thereto. In the embodiment shown in FIG. 12, the adjuster lever 46c has an actuating finger 84 formed by a laterally rearwardly bent tang that is received in a suitable opening 86 in the trailing shoe 14c. The pivot tang 88 is positioned in a suitable opening 90 in the mechanical brake actuating lever 38c, and the threads of the star wheel 36c and strut body 32c are right hand threads. In addition, the upper end of the spring 54c is anchored by merely hooking over the shoe retraction spring 40c.

It will be apparent that the objects of the invention previously enumerated have been achieved, and that there has been provided an automatic adjuster comprising a single stamped lever and single light spring, that can be installed on the brake structure with which it cooperates in a very simple and labor saving manner.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates and which fall within the purview of the following claims.

I claim:

1. An internal shoe drum brake comprising: a pair of opposing brake shoes having adjacent head ends and adjacent heel ends; an actuator for moving said head ends apart: a strong shoe return spring adjacent said actuator with one end connected to one shoe and the other end connected to the other shoe; an expansible star wheel actuated strut for limiting retractile movement of said head ends of said brake shoes; and which brake further includes a two part expansible assembly formed by one of the shoes and a shoe applying lever pivoted thereto for expanding against one end of the strut; an adjuster lever having a finger with a first abutment surface thereon for engaging the star wheel; said adjuster lever having a finger with a first abutment surface thereon for engaging the star wheel; said adjuster lever having a pivotal abutment spaced apart from said finger for hooking through a receiving hole in one of the shoes or one of the two parts of the expansible assembly adjacent one end of said strut, said adjuster lever having a third abutment for abutting either the adjacent end of the strut, or the other one of the two parts of the expansible assembly which abuts the adjacent end of the strut, said adjuster lever also having a fourth abutment surface for receiving a spring force, said fourth abutment surface projecting laterally outwardly from said adjuster; and spring biasing means interpositioned between said fourth abutment surface and other structure of the brake for biasing said finger rotationally toward the center line of said star wheel while at the same time forcing said finger and pivotal abutment laterally against said star wheel and portion of the brake to which said adjuster lever is pivoted, the structure of said brake being constructed and arranged with clearance for said adjuster lever to be rotated to a position below the strut where said spring biasing means can be coupled between said adjuster lever and said other structure of said brake and then rotated to a position above said strut to tension said spring means and following which release of said adjuster lever brings said finger into position against said star wheel, and following which said spring means rotates said star wheel when said actuator removes the force of said shoe return spring from said strut.

2. The brake of claim 1 wherein said adjuster lever has first and third abutment surfaces that are so arcuately shaped as to keep reaction forces thereon generally at a constant distance from the pivotal abutment.

3. An internal shoe drum brake comprising: a pair of opposing brake shoes having adjacent head ends and adjacent heel ends; an actuator for moving said head ends apart; a strong shoe return spring adjacent said actuator with one end connected to one shoe and the other end connected to the other shoe; an expansible star wheel actuated strut for limiting retractile movement of said head ends of said brake shoes; an adjuster lever having a finger with a first abutment surface thereon for engaging the star wheel, said adjuster lever having a pivotal abutment spaced apart from said finger for hooking through a receiving hole in one of the shoes, said adjuster lever having a third abutment for abutting the adjacent end of the strut, said adjuster lever also having a fourth abutment surface for receiving a spring force; said fourth abutment surface projecting laterally outwardly from said adjuster; and spring biasing means interpositioned between said fourth abutment surface and said one of said shoes biasing said finger rotationally toward the center line of said star wheel while at the same time forcing said finger and pivotal abutment laterally against said star wheel and said one of said shoes respectively, the structure of said brake being constructed and arranged with clearance for said adjuster lever to be rotated to a position below the strut where said spring biasing means can be coupled between said adjuster lever and said other structure of said brake and then rotated to a position above said strut to tension said spring means, and following which said spring biasing means rotates said star wheel when said actuator removes the force of said shoe return spring from said strut.

4. The brake of claim 3 wherein: said suitable hole has an abutment surface at one end and generally straight adjacent sides which diverge slightly therefrom, and said pivotal abutment of said adjuster lever is a tang of generally rectangular cross section with sufficient length to width ratio that it binds against said diverging sides of said suitably shaped hole in the shoe on which it is fixed when said spring biasing means exerts its force on said adjuster lever, and whereby said tang has sufficient clearance in said hole when held away from said abutment surface to permit said lever to be rotated below said strut for tensioning said spring biasing means, but when said tang is held against said abutment surface of said hole by said spring biasing means said tang becomes wedged between said adjacent sides to prevent said lever from moving below said strut.

5. An internal shoe drum brake comprising: a pair of opposing brake shoes having adjacent head ends and adjacent heel ends; an actuator for moving said head ends apart; an expansible star wheel actuated strut for limiting retractile movement of said head ends of said brake shoes; a shoe applying lever pivoted to the head end of one of said shoes for moving against the adjacent end of the strut; an adjuster lever having a finger with a first abutment surface thereon for engaging the star wheel, said adjuster lever having a pivotal abutment spaced apart from said finger for hooking through a receiving hole in said one of said shoes, said adjuster lever having a third abutment for abutting said shoe applying lever when it moves against said adjacent end of the strut, said adjuster lever also having a fourth abutment surface for receiving a spring force; and spring biasing means interpositioned between said fourth abutment surface and other structure of the brake biasing said finger rotationally toward the center line of said star wheel while at the same time forcing it laterally against its periphery.

6. The brake of claim 5 wherein: said pivotal abutment of said adjuster lever is a tang of rectangular cross section with sufficient length to width ratio that it will bind against the sides of a suitably shaped hole in the shoe on which it is fixed, said tang having a hook on the end thereof which hook extends away from said first abutment to catch the side of the shoe opposite from the side on which the adjuster lever is located, and said adjuster lever further including first and second pads positioned adjacent said third and pivotal abutments for engaging the shoe and shoe applying lever and holding the adjacent portions of the adjuster lever clear of the shoe.

7. An internal shoe drum brake comprising: a pair of opposing brake shoes having adjacent head ends and adjacent heel ends; an actuator for moving said head ends apart; an expansible star wheel actuated strut for limiting retractile movement of said head ends of said brake shoes; a shoe applying lever pivoted to the head end of one of said shoes for moving against the adjacent end of the strut; an adjuster lever having a finger with a first abutment surface thereon for engaging the star wheel; said adjuster lever having a pivotal abutment spaced apart from said finger for hooking through a receiving hole in said shoe applying lever, said adjuster lever having a third abutment for abutting said shoe to which said shoe applying lever is pivoted when it moves away from the adjacent end of the strut, said adjuster lever also having a fourth abutment surface for receiving a spring force, and spring biasing means interpositioned between said fourth abutment surface and other structure of the brake biasing said finger rotationally toward the center line of said star wheel while at the same time forcing it laterally against its periphery.

8. The brake of claim 7 wherein: said pivotal abutment has a hook on the end thereof catching the side of the lever opposite from the side on which the adjuster lever is located, and said adjuster lever further including first and second pads positioned adjacent said third and pivotal abutments for engaging the shoe and shoe applying lever and holding the adjacent portions of the adjuster lever clear of the shoe.

9. In an internal shoe drum brake of the type having two opposing shoes with a rotatable star wheel actuated expansible strut between the shoes for adjusting the retracted position of the shoes; an arcuately moveable pawl for rotating said star wheel when the shoes are moved apart by more than a predetermined distance from their retracted positions as determined by the strut, said arcuately moveable pawl having a tooth advancing arcuate movement between a first retracted position and an advanced position over which it will advance said star wheel a tooth at a time, said pawl including a tang bent generally laterally to the plane of its arcuate tooth advancing movement, said tang being received in a pivot hole in brake structure adjacent said star wheel, said pivot hole having a pair of generally divergent sides proceeding away from a short abutment surface for said tang, said tang being generally rectangular in cross section with a length greater than the space between said diverging sides adjacent said abutment surface, and whereby rotation of said pawl is limited from going beyond said advanced position when said tang is held against said abutment surface but can be rotated well beyond said advanced position before engaging said diverging sides when said tang is moved away from said abutment surface.

10. For an internal shoe drum brake having a pair of opposing shoes with adjacent head ends of the shoes being adapted to be spread apart to apply the brake, a strong shoe return spring adjacent said head ends with one end connected to one shoe and the other end connected to the other shoe; and with an expansible strut between the head ends of the shoes for limiting the retraction of the shoes, the strut having a star wheel which when rotated in an advancing direction expands the strut, said star wheel actuating mechanism comprising: an adjuster lever having a finger with a first abutment surface thereon for engaging the star wheel, a pivotal abutment spaced apart from said finger for hooking through a receiving pivot hole in one of the shoes, said adjuster lever also having a fourth abutment surface for transmitting a spring force to said star wheel adjuster lever, said fourth abutment surface projecting laterally outwardly from said adjuster; and spring biasing means for interpositioning between said fourth abutment surface and other structure of the brake for biasing said finger rotationally toward the center line of said star wheel and at the same time forcing it laterally against said star wheel and said one of said shoes, the structure of said brake being constructed and arranged with clearance for said adjuster lever to be rotated to a position below the strut where said spring biasing means is installed between said adjuster lever and said one of said shoes following which the adjuster is rotated to a position above said strut to tension said spring means and then released to allow said spring to bring said finger into position against said star wheel, and whereby during operation said spring means rotates said star wheel when said actuator removes the force of said shoe return spring from said strut.

11. The star wheel actuating mechanism of claim 10 wherein: said pivotal abutment of said adjuster is a tang bent at generally right angles to the main portion of the adjuster lever, and said pivot hole has a pair of generally divergent sides proceeding away from a short abutment surface for said tang, said tang being generally rectangular in cross section with a length greater than the space between said diverging sides adjacent said abutment surface, and whereby rotation of said pawl is limited from going beyond said advanced position when said tang is held against said abutment surface but can be rotated well beyond said advanced position before engaging said diverging sides when said tang is moved away from said abutment surface.

* * * * *